(12) United States Patent
Benson et al.

(10) Patent No.: US 9,865,022 B2
(45) Date of Patent: *Jan. 9, 2018

(54) SYSTEM AND METHOD FOR DEFINING A DRILLING PATH BASED ON COST

(71) Applicant: MOTIVE DRILLING TECHNOLOGIES INC., Dallas, TX (US)

(72) Inventors: Todd Benson, Dallas, TX (US); John Burkhart, Dallas, TX (US); Teddy Chen, Austin, TX (US)

(73) Assignee: Motive Drilling Technologies, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,661

(22) Filed: Jun. 13, 2016

(65) Prior Publication Data

US 2016/0300313 A1 Oct. 13, 2016

Related U.S. Application Data

(63) Continuation of application No. 14/660,298, filed on Mar. 17, 2015, which is a continuation of application (Continued)

(51) Int. Cl.
*G06Q 10/06* (2012.01)
*G06Q 50/02* (2012.01)
(Continued)

(52) U.S. Cl.
CPC ............... *G06Q 50/02* (2013.01); *E21B 7/00* (2013.01); *E21B 7/04* (2013.01); *E21B 41/0092* (2013.01);
(Continued)

(58) Field of Classification Search
CPC ........ E21B 41/0092; E21B 43/30; E21B 7/04; G06Q 10/06313; G06Q 50/02
(Continued)

(56) References Cited

U.S. PATENT DOCUMENTS

| 7,684,929 B2 * | 3/2010 | Prange | ...................... E21B 7/04 166/245 |
| 2002/0103630 A1 * | 8/2002 | Aldred | .................... E21B 44/00 703/10 |

(Continued)

FOREIGN PATENT DOCUMENTS

| WO | 2010053618 A1 | 5/2010 |
| WO | 2012173601 A1 | 12/2012 |

OTHER PUBLICATIONS

Saputelli et al., "Real-Time Decision-Making for Value Creation While Drilling," Oct. 20-22, 2003, SPE/IADC 1 85314; Middle East Drilling Technology Conference & Exhibition, Abu Dhabi, UAE, pp. 20-22.*

(Continued)

*Primary Examiner* — Kevin Flynn
*Assistant Examiner* — Freda A Nelson
(74) *Attorney, Agent, or Firm* — Vinson & Elkins L.L.P.

(57) ABSTRACT

Provided is a method for selecting one of a plurality of convergence paths that may be drilled by a bottom hole assembly (BHA) comprising identifying, by a computer system, a plurality of geometric convergence paths, wherein each of the geometric convergence paths provides a convergence solution from a defined bottom hole assembly (BHA) location to a target drilling path of a well plan. An offset distance is calculated for drilling by the BHA each of the geometric convergence paths connecting the BHA location to the target drilling path. A drill path curvature associated with drilling each of the geometric convergence paths by the BHA is determined by the computer system. A time required (Continued)

for drilling each of the geometric convergence paths by the BHA is determined by the computer system. An optimal geometric convergence path of the plurality of geometric convergence paths is determined responsive to the offset distance for drilling each of the geometric convergence paths, the drill path curvature associated with each of the geometric convergence paths and the time required for drilling each of the geometric convergence paths. The determined optimal geometric convergence path is fed to a controller associated with a display of a drilling rig and used to control the display of the drilling rig to display the determined optimal geometric convergence path.

27 Claims, 11 Drawing Sheets

Related U.S. Application Data

No. 14/067,390, filed on Oct. 30, 2013, now Pat. No. 8,996,396.

(60) Provisional application No. 61/839,731, filed on Jun. 26, 2013.

(51) Int. Cl.
| | | |
|---|---|---|
| *E21B 7/00* | (2006.01) | |
| *E21B 7/04* | (2006.01) | |
| *E21B 41/00* | (2006.01) | |

(52) U.S. Cl.
CPC ..... *G06Q 10/063* (2013.01); *G06Q 10/06313* (2013.01); *G06Q 10/06375* (2013.01)

(58) Field of Classification Search
USPC ........ 703/5, 10; 166/369; 702/7, 9; 705/7.35
See application file for complete search history.

(56) References Cited

U.S. PATENT DOCUMENTS

| | | | |
|---|---|---|---|
| 2009/0006058 A1* | 1/2009 | King | E21B 12/02 703/10 |
| 2009/0056935 A1 | 3/2009 | Prange et al. | |
| 2010/0191516 A1* | 7/2010 | Benish | E21B 43/00 703/10 |
| 2010/0259415 A1* | 10/2010 | Strachan | E21B 44/00 340/853.6 |
| 2011/0153300 A1* | 6/2011 | Holl | E21B 47/022 703/10 |
| 2011/0161133 A1* | 6/2011 | Staveley | E21B 44/00 705/7.28 |
| 2012/0285701 A1* | 11/2012 | Cheng | E21B 43/30 166/369 |

OTHER PUBLICATIONS

European Patent Office: Extended European Search Report for EP 14817595 (related application); Sep. 22, 2016; 11 pgs.

* cited by examiner

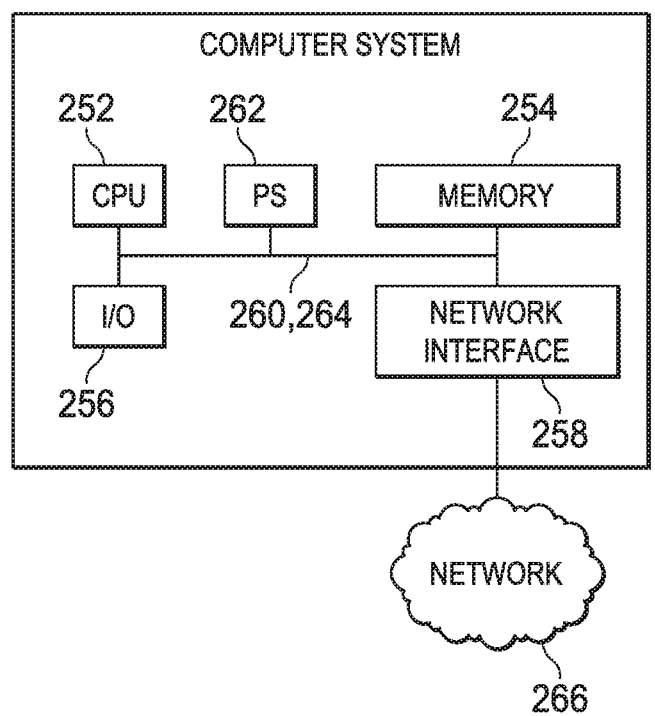

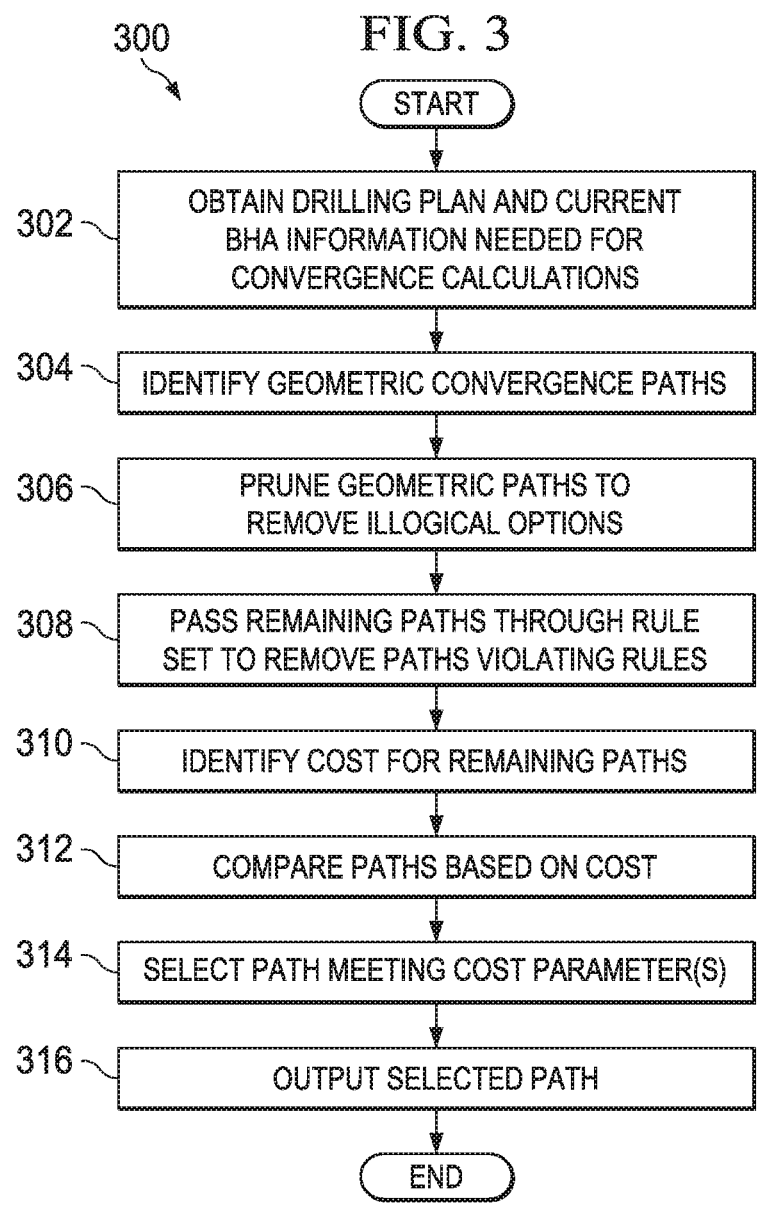

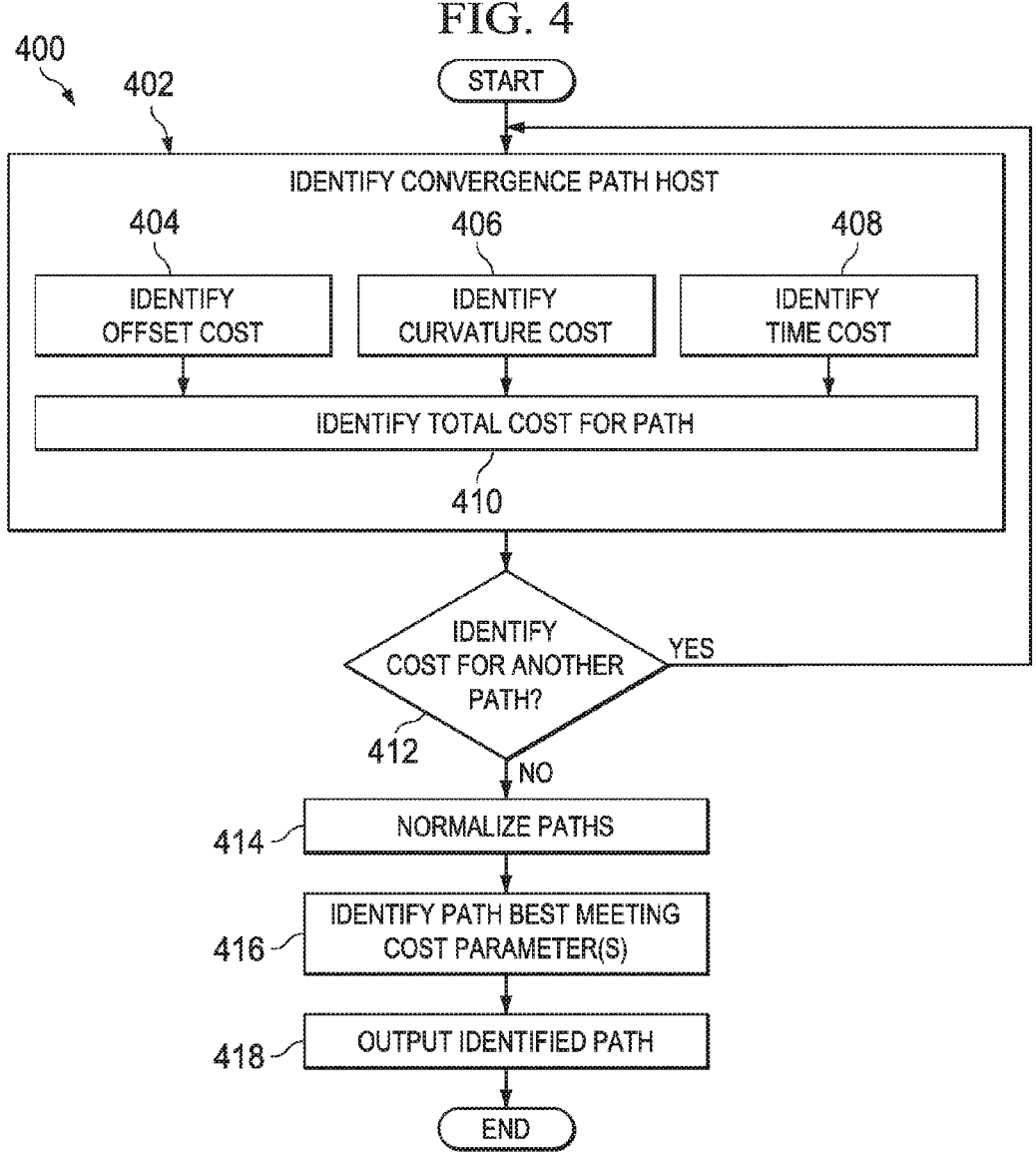

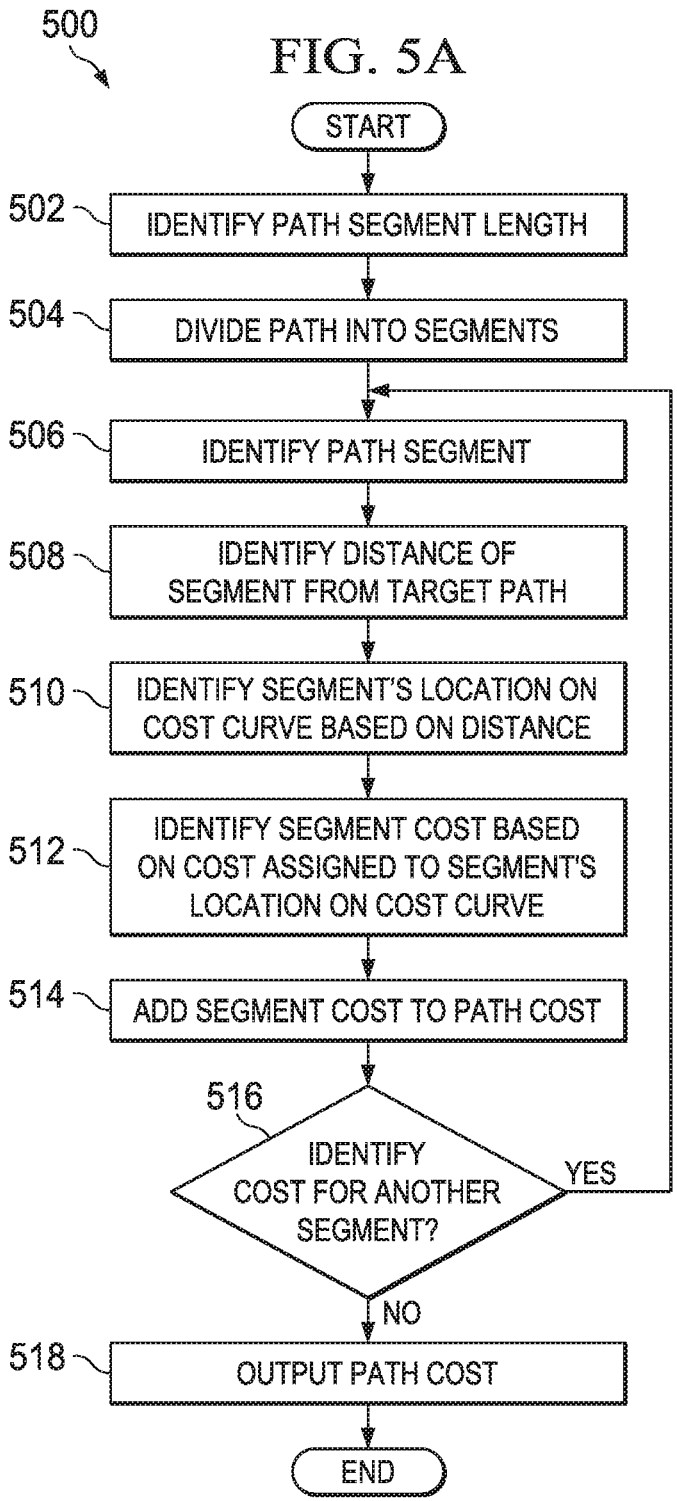

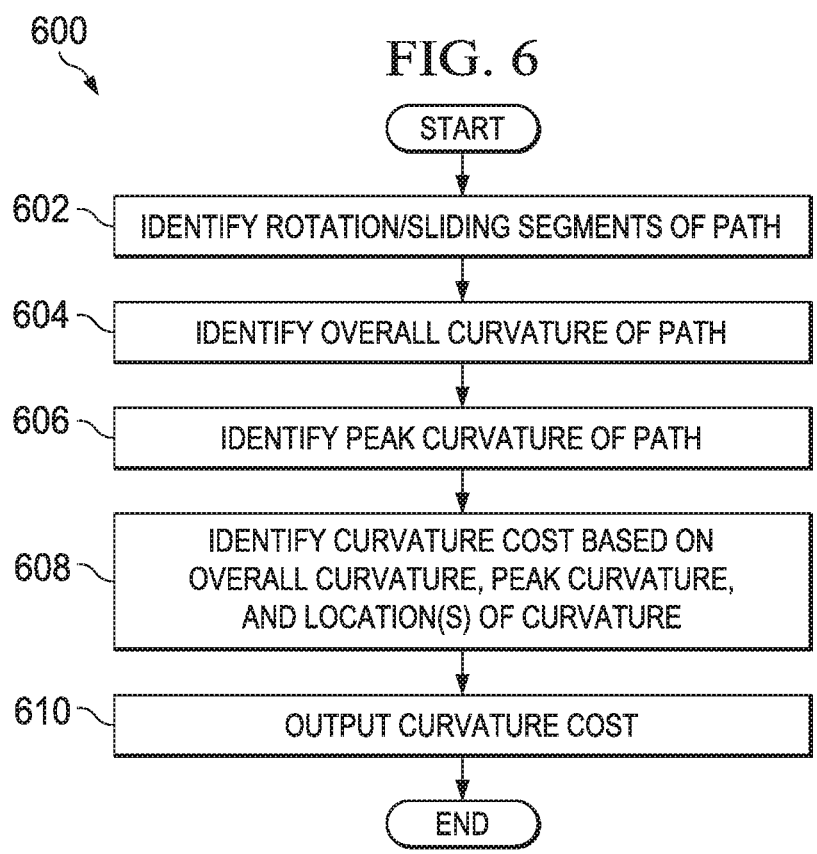

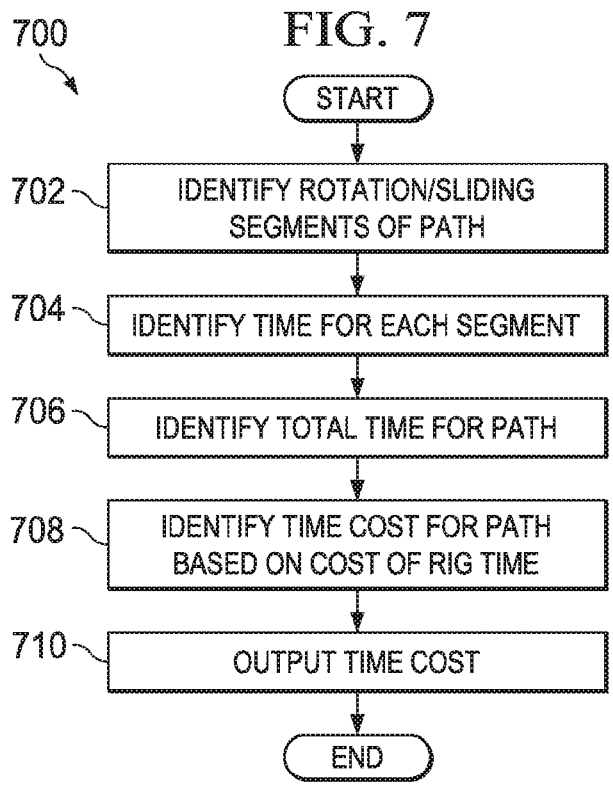
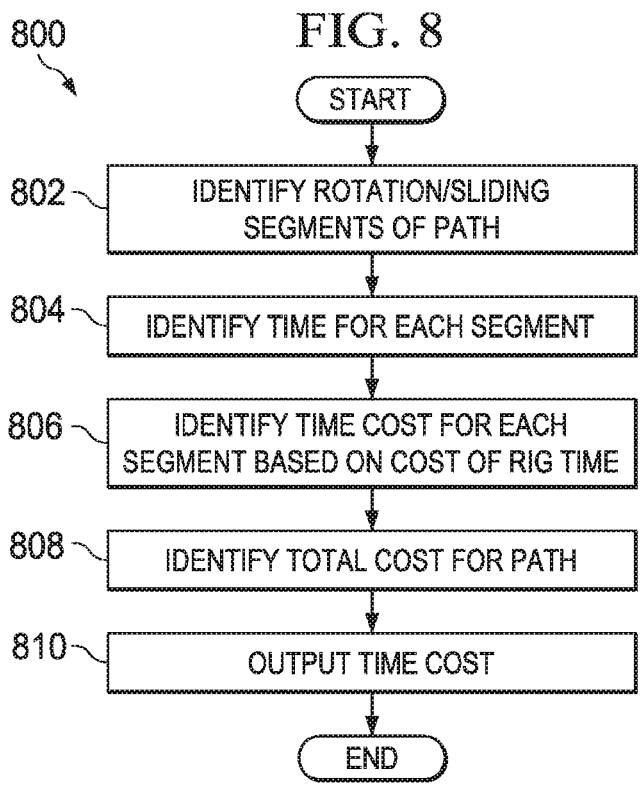

SYSTEM AND METHOD FOR DEFINING A DRILLING PATH BASED ON COST

CROSS-REFERENCE TO RELATED APPLICATIONS

This application is a continuation of U.S. patent application Ser. No. 14/660,298, filed Mar. 17, 2015, entitled SYSTEM AND METHOD FOR SELECTING A DRILLING PATH BASED ON COST, which is a continuation of U.S. patent application Ser. No. 14/067,390, filed Oct. 30, 2013, entitled SYSTEM AND METHOD FOR DEFINING A DRILLING PATH BASED ON COST, now U.S. Pat. No. 8,996,396, issued Mar. 31, 2015, which claims the benefit of U.S. Provisional Application No. 61/839,731, filed Jun. 26, 2013, and entitled SYSTEM AND METHOD FOR SELECTING A DRILLING PATH BASED ON COST, the specifications of which are incorporated herein by reference in their entirety.

TECHNICAL FIELD

The following disclosure relates to directional and conventional drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations.

BRIEF DESCRIPTION OF THE DRAWINGS

For a more complete understanding, reference is now made to the following description taken in conjunction with the accompanying Drawings in which:

FIG. 2B illustrates one embodiment of a computer system that may be used within the environment of FIG. 2A;

FIG. 3 illustrates a flow chart of one embodiment of a method that may be used to select one of a plurality of convergence paths based on cost;

FIG. 4 illustrates a flow chart of one embodiment of a method that may be used with the method of FIG. 3 to identify the cost of a convergence path;

FIG. 5A illustrates a flow chart of one embodiment of a method that may be used with the method of FIG. 4 to identify the offset cost of a convergence path;

FIG. 6 illustrates a flow chart of one embodiment of a method that may be used with the method of FIG. 4 to identify the curvature cost of a convergence path; and FIGS. 7 and 8 illustrate flow charts of different embodiments of a method that may be used with the method of FIG. 4 to identify the time cost of a convergence path.

DETAILED DESCRIPTION

Figure 1:
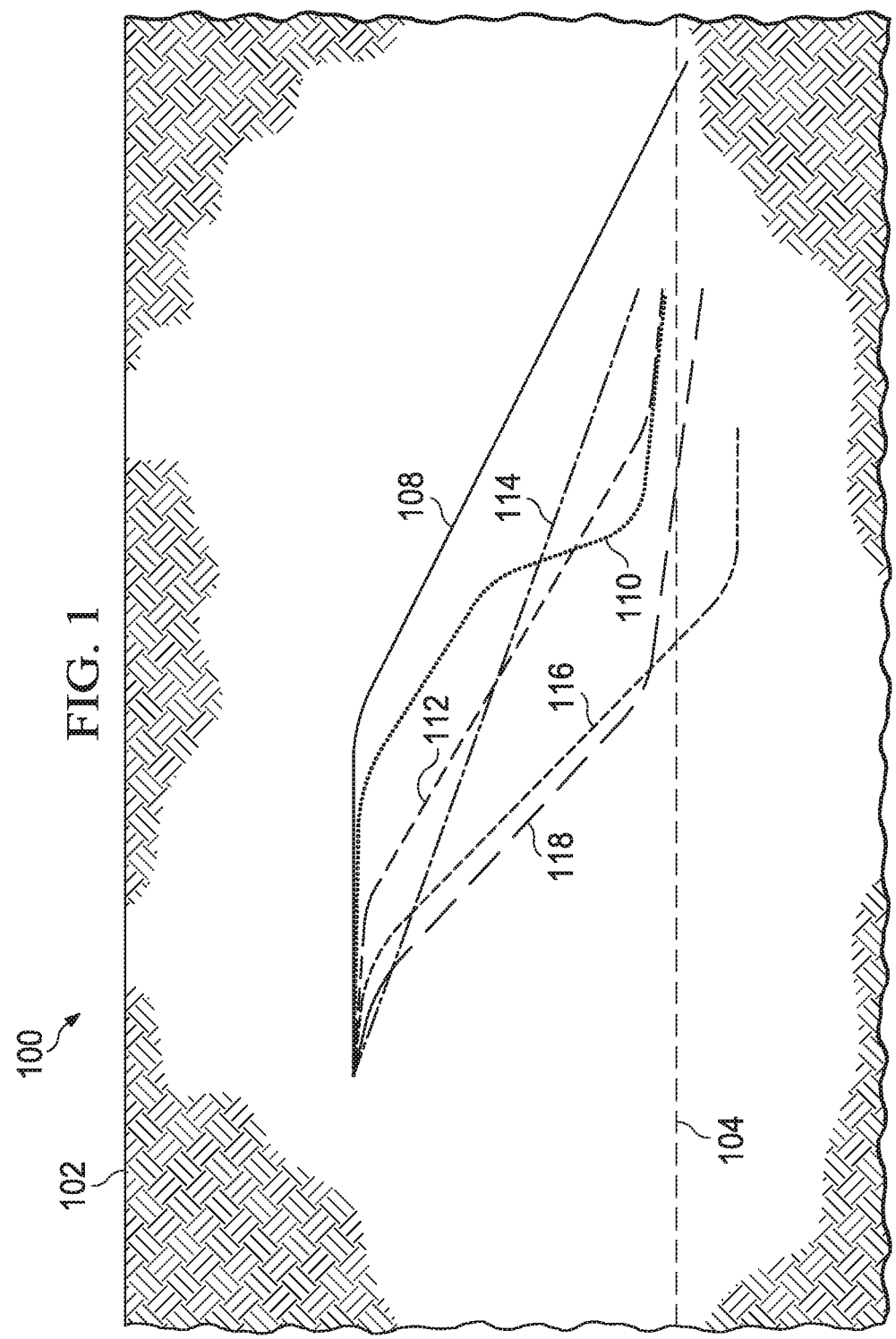
FIG. 1 illustrates one embodiment of an environment within which various aspects of the present disclosure may be implemented.

Referring now to the drawings, wherein like reference numbers are used herein to designate like elements throughout, the various views and embodiments of a system and method for selecting a drilling path based on cost are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, one embodiment of an environment 100 is illustrated with a formation 102. A borehole is to be drilled or is being drilled within the formation 102 and there is a target path 104 for the borehole. Calculating paths for a borehole in a formation is a complex and often difficult to understand process that frequently uses a combination of known factors and estimates. Whether calculating the path prior to the beginning of drilling or attempting to return to a desired path when drilling has gone off course, there are an infinite number of paths from which to choose. Each of these paths has an associated financial cost that is difficult to identify due to the number of factors involved. However, the financial cost of a path is important to the business of drilling and needs to be taken into account. Accordingly, by normalizing drilling variables into a monetary unit (e.g., United States dollars) as described in the present disclosure, multiple path options can be evaluated in terms of financial cost and the path that best satisfies one or more defined cost parameters can be selected.

In the present example, the target path 104 represents an optimal path that has zero cost and provides maximum value. In other words, following the target path 104 has no penalty as there is no "better" way to drill through the formation 102 than along the target path 104. It is understood that "better" is a relative term that may be based on various selected factors, imperfect data and/or conclusions, and/or available equipment, and so may not be the actual best possible path if other factors were selected, additional information was known, and/or if other equipment was available. In terms of cost, the target path 104 has zero cost because there is no penalty for being on target. In other words, while there is a drilling cost associated with the target path 104 because the target path 104 cannot be drilled for free, the target path 104 is assigned zero cost in the present example because the cost of the target path 104 is the baseline cost and only paths that stray from the target path 104 will be assigned cost penalties. The target path 104 may be defined by a well plan, seismic data, and/or any other information suitable for delineating the path through the formation 102.

For purposes of example, paths 108, 110, 112, 114, 116, and 118 illustrate possible convergence paths from a point 106 representing a current or future bottom hole assembly (BHA) location to the target path 104. Although not discussed in detail herein, the calculation of the convergence paths themselves may use any of a number of processes. One possible method for such convergence path calculations is disclosed in U.S. application Ser. No. 13/530,298, filed on Jun. 22, 2012, and entitled SYSTEM AND METHOD FOR DETERMINING INCREMENTAL PROGRESSION BETWEEN SURVEY POINTS WHILE DRILLING, which is hereby incorporated by reference in its entirety.

As will be discussed below, after the paths 108, 110, 112, 114, 116, and 118 are calculated, each path may be assigned a cost and then evaluated based on that cost relative to the costs of the other paths. For example, from a distance perspective, path 108 has a greater length than path 116 and much of that length is farther from the target path 104 than the length of path 110. In contrast, path 110 narrows the distance to the target path 104 more rapidly. However, path 110 requires more sliding, which takes time and introduces complexities in steering. These factors and/or others need to be weighed to determine whether the shorter length of path 110 actually results in a lower cost. Paths 108 and 116 converge sharply with the target path 104 and it appears likely that overshoot will occur unless an unrealistic build rate is applied. Path 114 may converge sharply, but does not extend far enough to determine what will happen. Paths 110, 112, and 118 offer more reasonable convergence angles, although some correction may still need to be made. The paths 108, 110, 112, 114, 116, and 118 offer various alternatives, each with different curvature, length, offset from the target path 104, and time considerations that affect the cost of that particular path. To address costs beyond the point of convergence, each path may also have an extension cost, which will be discussed in greater detail below.

By calculating a monetary value (e.g., a value in United States dollars) for a particular segment of a path (e.g., a unit of measure such as a foot) and adding up all the segments for the path, a cost can be identified for a particular path. For example, assume that the target path has a value of $1000 per foot based on a PV10 value (e.g., the present value of estimated future oil and gas revenues, net of estimated direct expenses, discounted at an annual discount rate of 10%). The target path 104 would be $0 per foot in cost. A cost for a convergence path can then be calculated for each segment (e.g., foot) of the convergence path based on the target path's value, and the total cost of all the segments is the cost of the convergence path.

The process of calculating the cost of a path may involve identifying any of a number of different types of cost, such as a distance cost, a sliding cost, a curvature cost, a time cost, a dogleg cost, a deviation cost, and/or a launch penalty cost. Some of these costs may be used to calculate other costs. For example, the launch penalty cost may be used to calculate the curvature cost.

Accordingly, the present disclosure may be used to provide a relatively easy to understand picture of which path should be selected from many different possible paths from a cost standpoint. For example, if the borehole is being drilled and the BHA is off of the target path, a cost comparison may be used to determine the best convergence path in terms of cost for returning the BHA to the target path when there are an infinite number of paths from which to choose. As the best convergence path may not be the shortest or most direct path, using a cost based selection analysis enables drilling decisions to be based on maximizing value and minimizing cost.

Although FIG. 1 is a two-dimensional drawing, it is understood that the various paths illustrated in FIG. 1 may be three-dimensional in nature. Furthermore, it is understood that although various lines are illustrated as straight lines for purposes of clarity (e.g., the target path 104), such lines need not be straight. Furthermore, although shown as lines, it is understood that paths may be zones. For example, the target path 104 may be a three dimensional zone and drilling inside the zone may be assigned zero cost.

Figure 2A:
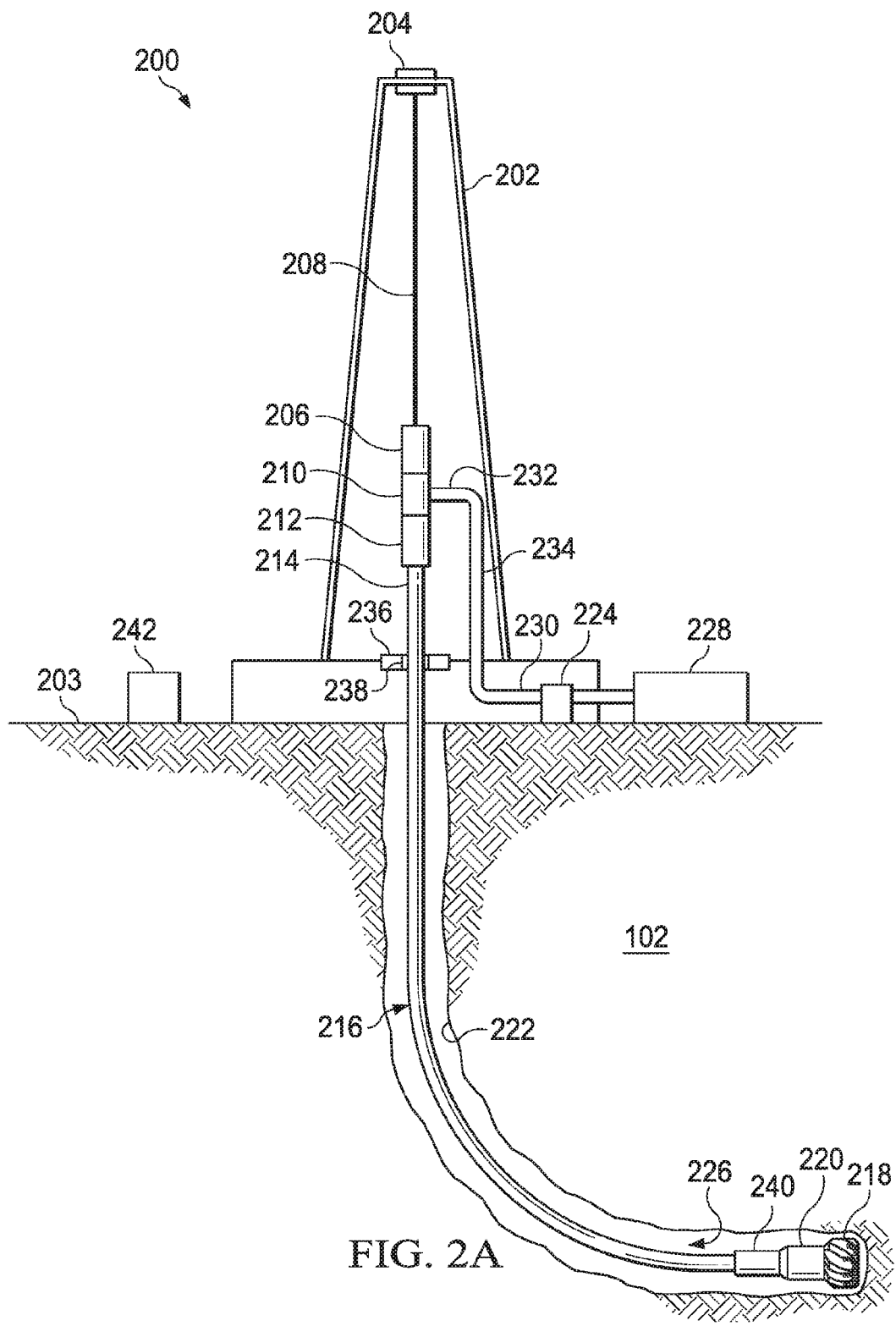
FIG. 2A illustrates one embodiment of a drilling system that may be used within the environment of FIG. 1.

Referring to FIG. 2A, one embodiment of a drilling environment 200 is illustrated that may be used within the environment of FIG. 1. Although the environment 200 is a drilling environment that is described with a top drive drilling system, it is understood that other embodiments may include other drilling systems, such as rotary table systems.

In the present example, the environment 200 includes a derrick 202 on a surface 203. The derrick 202 includes a crown block 204. A traveling block 206 is coupled to the crown block 204 via a drilling line 208. In a top drive system (as illustrated), a top drive 210 is coupled to the traveling block 206 and provides the rotational force needed for drilling. A saver sub 212 may sit between the top drive 210 and a drill pipe 214 that is part of a drill string 216. The top drive 210 rotates the drill string 216 via the saver sub 212, which in turn rotates a drill bit 218 of a BHA 220 in a borehole 222 in the formation 102. A mud pump 224 may direct a fluid mixture (e.g., mud) 226 from a mud pit or other container 228 into the borehole 222. The mud 226 may flow from the mud pump 224 into a discharge line 230 that is coupled to a rotary hose 232 by a standpipe 234. The rotary hose 232 is coupled to the top drive 210, which includes a passage for the mud 226 to flow into the drill string 216 and the borehole 222. A rotary table 236 may be fitted with a master bushing 238 to hold the drill string 216 when the drill string is not rotating.

Some or all of a control system 242 may be located at the derrick 202, may be downhole, and/or may be remote from the actual drilling location. For example, the control system 242 may be a system such as is disclosed in U.S. Pat. No. 8,210,283 entitled SYSTEM AND METHOD FOR SURFACE STEERABLE DRILLING, filed on Dec. 22, 2011, and issued on Jul. 3, 2012, which is hereby incorporated by reference in its entirety. Alternatively, the control system 242 may be a standalone system or may be incorporated into other systems at the derrick 202. The control system 242 may communicate via a wired and/or wireless connection (not shown).

Referring to FIG. 2B, one embodiment of a computer system 250 is illustrated. The computer system 250 is one possible example of a system component or device such as the control system 242 of FIG. 2A or a separate system used to perform the various processes described herein. In scenarios where the computer system 250 is on-site, such as within the environment 100 of FIG. 1, the computer system may be contained in a relatively rugged, shock-resistant case that is hardened for industrial applications and harsh environments. It is understood that downhole electronics may be mounted in an adaptive suspension system that uses active dampening as described in various embodiments herein.

The computer system 250 may include a central processing unit ("CPU") 252, a memory unit 254, an input/output ("I/O") device 256, and a network interface 258. The components 252, 254, 256, and 258 are interconnected by a transport system (e.g., a bus) 260. A power supply (PS) 262 may provide power to components of the computer system 250 via a power transport system 264 (shown with data transport system 260, although the power and data transport systems may be separate).

It is understood that the computer system 250 may be differently configured and that each of the listed components may actually represent several different components. For example, the CPU 252 may actually represent a multiprocessor or a distributed processing system; the memory unit 254 may include different levels of cache memory, main memory, hard disks, and remote storage locations; the I/O device 256 may include monitors, keyboards, and the like; and the network interface 258 may include one or more network cards providing one or more wired and/or wireless connections to a network 266. Therefore, a wide range of flexibility is anticipated in the configuration of the computer system 250.

The computer system 250 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 250. The operating system, as well as other instructions (e.g., software instructions for performing the functionality described in previous embodiments) may be stored in the memory unit 254 and executed by the processor 252. For example, the memory unit 254 may include instructions for performing the various methods and control functions disclosed herein.

The network 266 may be a single network or may represent multiple networks, including networks of different types. For example, the network 266 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the computer system 250 to other components of the environment 200 of FIG. 2A and/or to other systems not shown (e.g., remote systems).

Referring to FIG. 3, one embodiment of a method 300 illustrates a process that may be used to select a convergence path from multiple possible convergence paths when a BHA (e.g., the BHA 220 of FIG. 2A) is off a target path (e.g., the target path 104 of FIG. 1). In the three dimensional space of a formation (e.g., the formation 102 of FIG. 1), there may be an infinite number of possible convergence paths. The method 300 may be used to identify multiple possible convergence paths, narrow the identified paths to a single "best" path based on cost, and select that path as the path to be used.

It is understood that "best" is a relative term that may be based on one or more parameters, and so may not be the best path if other parameters are selected. In the present example, the best path is the lowest cost path in terms of a monetary unit, but it is understood that the best path may be otherwise defined. For example, in some embodiments, the best path may be the second to lowest cost path or may be the lowest cost path based on a particular cost parameter (e.g., time cost). Accordingly, while the best path is the path with the lowest overall cost for purposes of example, other best paths may exist and may be selected based on the particular needs for a path.

In step 302, drilling plan information is obtained for convergence solution calculations if it has not already been obtained. The drilling plan information may be a well plan, seismic data, and/or any other information that defines the target path 104 that the BHA 220 is to follow. Current BHA information such as location, trajectory, ROP, and other information may also be obtained so that a convergence plan can be calculated to realign the BHA with the target path 104. Other information, such as drift information, may be obtained if not included in the drilling plan information for use in sliding and/or rotation calculations.

In step 304, multiple geometric paths are calculated. The number of geometric paths that are calculated may depend on factors such as available processing power and/or the number and/or values of selected parameters (e.g., parameters may be selected to constrain the number of geometric paths). For example, parameters may limit the minimum and/or maximum length of a path, the maximum allowable dogleg severity, the direction, the inclination, and/or other path variables. The total number of paths may be limited by selecting appropriate parameters and parameter values. For purposes of example, 500,000 paths may be calculated, but it is understood that fewer or more (e.g., one million or more) paths may be calculated in other embodiments.

In step 306, the geometric paths are pruned to remove illogical options. For example, while geometrically possible, some paths may go in the wrong direction at some point and yet still converge. These paths can be eliminated as they are not likely to be the lowest cost solution. In some embodiments, step 306 may be handled as parameters used in step 304 (e.g., parameters may be selected that remove the possibility of calculating paths that go in the wrong direction). The pruning of step 306 reduces the number of paths for which later calculations are needed. This may speed up calculations, thereby providing a performance benefit.

In step 308, the paths remaining after the pruning of step 306 are passed through a rule set and paths violating the rules are removed from consideration. For example, one or more rules may define a threshold for maximum allowable dogleg severity. Any paths that have doglegs above the threshold may be discarded. One or more other rules may define a threshold for a maximum allowable curvature for the entire path and any paths having an overall curvature above the threshold may be discarded. The rule set may be used to provide a relatively fine level of control and/or may be used to test different outcomes without having to redo the pruning of step 306.

It is understood that the method 300 may handle steps 304, 306, and 308 in different ways depending on how the method 300 is implemented, and that steps 304, 306, and/or 308 may overlap or be combined in some embodiments. For example, as described previously, parameters may be used in step 304 to constrain the identification of the geometric convergence paths. Accordingly, the pruning of step 306 and rule set application of step 308 may vary depending on the functionality provided by step 304. Generally, steps 306 and/or 308 provide the ability to refine the selection process for deciding which geometric convergence paths are to be passed on for cost analysis.

In step 310, a cost may be identified for each path remaining after step 308. As will be described later in greater detail, the cost of a path may be dependent on various factors such as an offset cost that penalizes a path based on distance from the target path, a curvature cost that penalizes a path for the path's curvature (which has an impact on friction), and/or a time cost that penalizes a path based on the amount of time the path will take. For purposes of example, all three of these costs are used to calculate the total cost for a path, but it is understood that fewer factors may be used in some embodiments, and that more factors may be used in other embodiments.

In step 312, the paths are compared based on cost and, in step 314, the path that best meets one or more defined cost parameters is selected. For example, the lowest cost path may be selected. In step 316, the selected path is output. Although not shown in FIG. 3, the output may be used to provide drilling instructions for directing the BHA back to the target path. For example, the output may be used with the control system described in previously incorporated U.S. Pat. No. 8,210,283 (SYSTEM AND METHOD FOR SURFACE STEERABLE DRILLING) to provide or otherwise form the basis for drilling instructions.

It is understood that various steps may be added or removed from FIG. 3. For example, in some embodiments, the method 300 may import previously calculated geometric convergence paths (removing the need for steps 302 and 304). In other embodiments, those imported paths may have already been pruned (removing the need for step 306) and/or passed through the rule set (removing the need for step 308).

Referring to FIG. 4, one embodiment of a method 400 illustrates a process that may be used to identify the cost of multiple convergence paths and then select one of the paths. In the present example, the cost of a path is based on the offset cost, the curvature cost, and the time cost as described above.

In step 402, the cost for a convergence path is identified. More specifically, the offset cost is identified in step 404, the curvature cost is identified in step 406, and the time cost is identified in step 408. It is understood that identifying the offset cost, the curvature cost, and the time cost may involve two or more calculations for each cost. For example, the offset cost, the curvature cost, and/or the time cost may be identified from both an azimuth perspective and a true vertical depth (TVD) perspective. These two dimensional costs may then be added together to identify a single offset cost. In other embodiments, three dimensional calculations may be used to determine the offset cost. Examples of steps 404, 406, and 408 are described in greater detail below. In step 410, the outputs of steps 404, 406, and 408 are combined to identify the total cost for the path.

In step 412, a determination may be made as to whether the cost of another path is to be identified. If the cost of another path is to be identified, the method 400 returns to step 402 and calculates the cost of the next path. If no path remains for which the cost is to be calculated, the method 400 continues to step 414, where the paths are normalized.

Normalization may be performed because the paths may not be the same length due to factors such as differences in the timing and length of rotation and sliding segments. The present embodiment may use rotate/slide pairs for purposes of calculations, although each pair may have a zero factor where there is either zero rotation or zero sliding. This means that two rotations or two slides may be chained together directly if the intervening segment is zero. The present embodiment may have minimum and maximum path lengths defined for the geometric search engine and a path may not stop on convergence. It is understood that convergence does not necessarily mean that the path actually merges with the target path 104.

Not stopping on convergence means that the path may continue after convergence, which extends the length of the path. This extension has a cost that may be calculated separately from the path cost and may be used in comparing paths to identify the least cost path. For example, referring to FIG. 1, each path 108, 110, 112, 114, 116, and 118 is extended past the planned convergence path. As discussed previously, paths 108 and 118 converge sharply (e.g., aggressively) with the target path 104, while paths 110, 112, and 118 offer more reasonable (e.g., less aggressive) convergence angles, although some correction may still need to be made. Accordingly, by extending the paths past convergence, paths with higher backend loaded costs may be identified. For example, path 108 may need a significant amount of correction to deal with the amount of overshoot caused by the aggressive convergence angle, while path 118 needs much less correction. By calculating the extension cost as well as the path cost, a more complete cost picture can be formed.

A path may be defined in terms of vertical zones, build zones, and lateral zones, with each zone having its own set of rules. For example, a build zone may have a maximum allowed curvature of fourteen degrees, while a lateral zone may have a maximum allowed curvature of four degrees. Due to geological factors such as drift, drilling a path as a straight line may not actually result in a straight line because rotational drilling has a tendency to curve due to drift. When formulating and reviewing plans, the geological drift may be accounted for by drilling somewhat off course relative to a straight line path and/or by planning corrective slides. Drifting may impose a cost when it causes undesirable deviations from the plan and may also require a cost for any corrections needed to account for the drift. Furthermore, a path may use geological drift (if present in the formation) to account for sliding time and other corrective measures (e.g., may allow the drift to correct the course instead of performing a slide). However, if the amount of drift results in a course correction that is too slow and/or occurs over too great a distance, the drift correction may not occur fast enough to negate the offset cost.

Accordingly, to balance these and other factors, the paths may use empirical geo-drift, ROP, and build rates (e.g., motor yields) to calculate convergence. Due to the many different factors present in a path (e.g., amount of progress made by a path), paths of different lengths (e.g., a three hundred foot path versus a four hundred foot path) may be normalized prior to comparison. For example, one path may be more expensive than another path, but the more expensive path may have made an additional fifty feet of progress compared to the cheaper path. This additional fifty feet of progress has positive value in terms of cost that is not taken into account if the paths are not normalized. This is illustrated in FIG. 1 with respect to paths 108 and 118, for example, with path 108 converging at a point farther down the target path 104 than the point at which path 118 converges.

In the present example, the normalization process is performed by normalizing all paths against the longest path as follows: (cost of path being normalized/length of path being normalized)*length of longest path. For example, if the longest path is four hundred feet long and the path being normalized is two hundred feet long and costs $75,000, the normalization would result in (($75,000/200)*400=$150,000). The total cost of the two hundred foot path used for comparison purposes would be $150,000, instead of the actual $75,000 cost. The four hundred foot plan will more expensive if its cost is greater than $150,000, and less expensive if its cost is less than $150,000. Accordingly, a cost of $125,000 for the four hundred foot path would make the four hundred foot path more expensive than the two hundred foot path prior to normalization, but less expensive after normalization is performed.

In step 416, following normalization, the path best meeting the cost parameter(s) is identified. For example, the lowest cost path may be identified. In step 418, the identified path is output. It is understood that steps 416 and 418 may be similar or identical to steps 316 and 318 of FIG. 3, but are included for purposes of better illustrating the overall process of FIG. 4. However, a path will generally be selected a single time (e.g., in one of steps 316 or 416) and output a single time (e.g., in one of steps 318 or 418), and so such duplicate steps may be omitted in an actual implementation of FIG. 3 and FIG. 4. For example, if steps 316 and 318 are implemented, step 416 may be omitted and step 418 may be used to output the normalized paths to step 316 for selection.

Referring to FIG. 5A, one embodiment of a method 500 illustrates a process that may be used as step 404 of FIG. 4 to identify the offset cost of a convergence path. It is understood that this is only an example of step 404 and other methods may be used.

In step 502, the length of a path segment is identified. For purposes of example, a segment is one foot in length, but it is understood that a segment may be defined in many different ways. For example, a segment may be defined as a distance (e.g., inches, centimeters, yards, or meters) or may be defined using one or more other measurement criteria (e.g., a length of pipe or a fraction of that length). In step 504, the path is divided into segments of the identified length. For example, a four hundred foot path would be divided into four hundred segments that are each one foot in length.

In step 506, a single path segment is identified for cost calculation purposes. The present step identifies which one of the segments is to have its cost calculated in this iteration of the method 500. In step 508, the segment's distance from the target path is identified. In step 510, the segment's location on a cost curve is calculated based on distance. As described previously, this location identifies the penalty that is to be applied to the segment, with the penalty generally increasing the farther the location is from the target path.

Figure 5B:
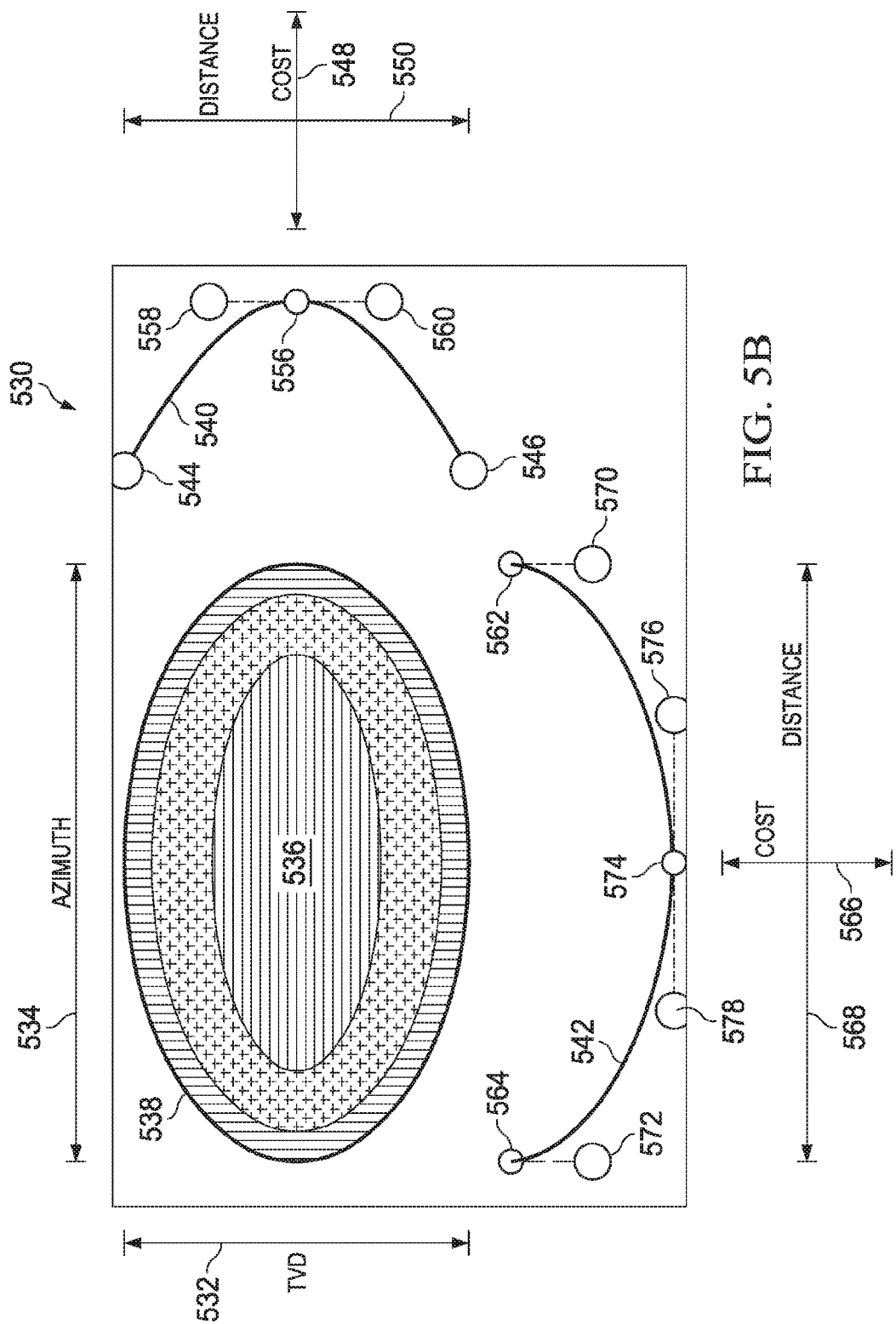
FIGS. 5B-5D illustrate embodiments of a two dimensional diagram of a cost curve.
Figure 5C:
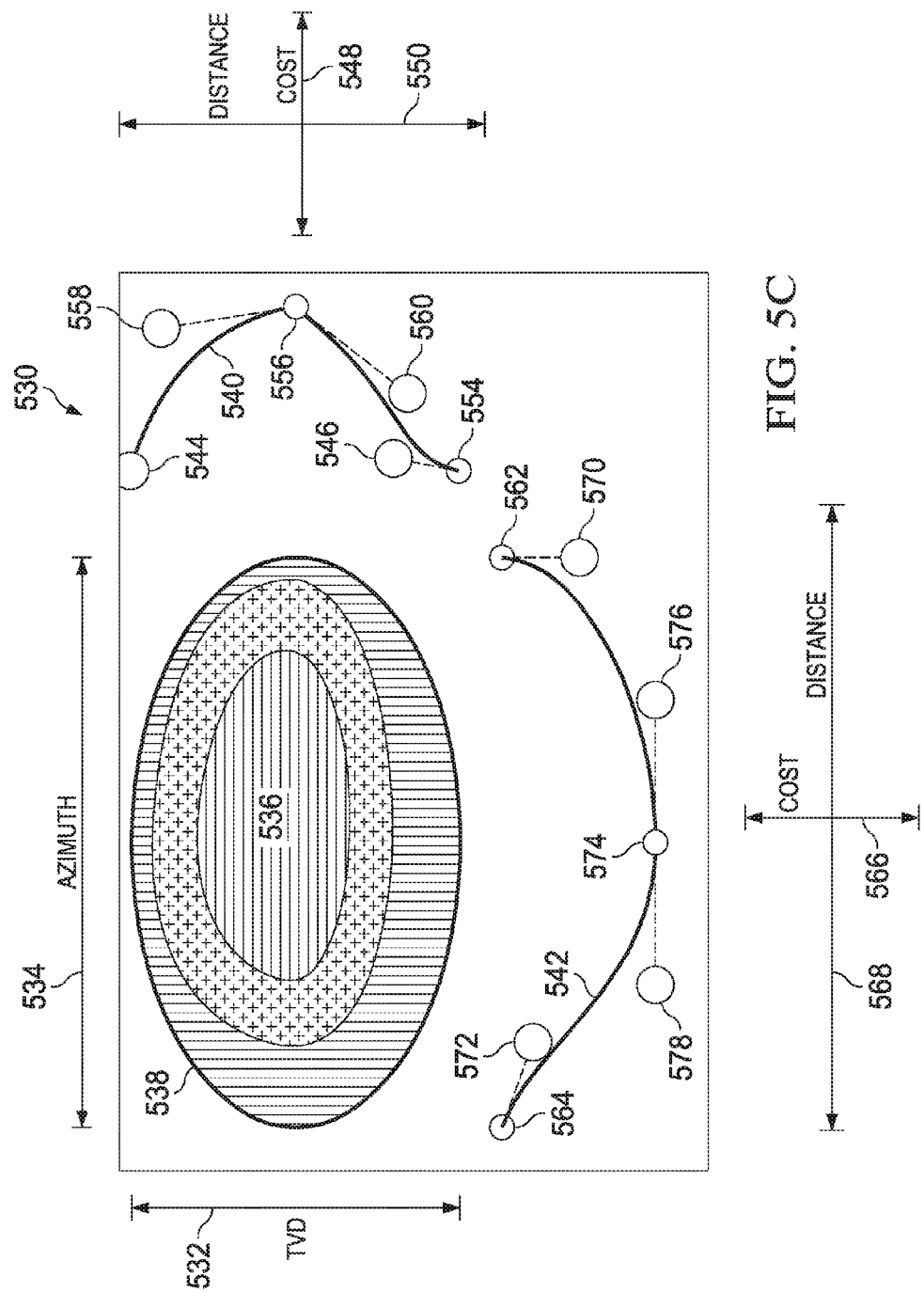
Figure 5D:
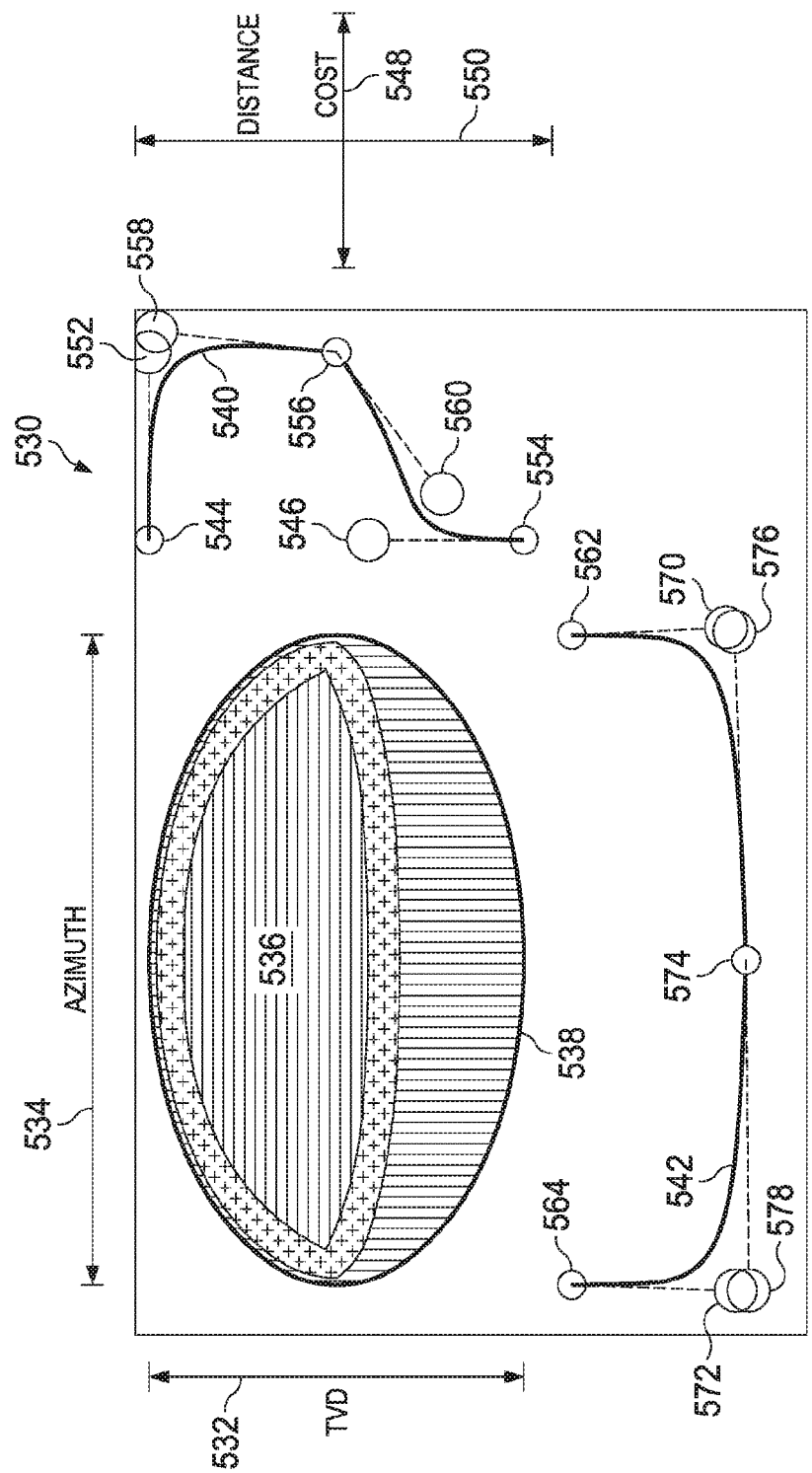

With additional reference to FIGS. 5B-D, various embodiments of a cost curve 530 are illustrated using two-dimensional diagrams. The cost curve 530 may show costs, including non-linear and/or non-symmetrical costs, against an axis 532 representing true vertical depth (TVD) and an axis 534 representing azimuth. As shown, the diagrams 530 may provide a region 536 of potential non-linear path costs surrounded by a boundary 538 that represents an outer limit of the non-linear costs. It is understood that costs may increase outside the boundary 538, but may be linear or non-linear. Without such cost increases outside the boundary, a potential solution that passes the boundary would incur no additional cost and there would be no cost pressure to return the solution to the region 536.

The region 536 may include colored and/or otherwise differentiated areas to indicate costs. For example, green (the center portion of the region 536 indicated by horizontal lines) yellow (the intermediate portion of the region 536 indicated by "+" signs), and red (the outer portion of the region 536 indicated by vertical lines) may be used to indicate areas of desirable, borderline, and undesirable costs, respectively. Shading or other indicia may be used to indicate graduated costs, such as going from a lighter red to a darker red. In addition, it is understood that the colors may not be separated by a clear line, but may fade into one another. For example, green may fade into yellow to indicate that costs are increasing, rather than having an abrupt transition from green to yellow.

In the present embodiment, the cost curve 530 may be manipulated along one or both axes 532 and 534 by modifying the location of lines 540 and 542. One or both of the lines 540 and 542 may be non-linear and/or non-symmetrical. Manipulation of the lines 540 and 542 may affect the region 536 (e.g., may shift the costs and therefore the coloration of the region) and/or the boundary 538 (e.g., may shift maximum costs limits).

For example, line 540 may be manipulated by moving points 544 and/or 546, which may be moved relative to a cost axis 548 and a distance axis 550. The points 544 and/or 546 represent the maximum cost penalty within the boundary 538. For purposes of illustration, the point 544 may be moved to a position 552 (FIG. 5D) and the point 546 may be moved to a position 554 (FIG. 5C). A portion of the line 540 is currently at position 556 and may be moved, for example, to a position 558 or a position 560.

Similarly, line 542 may be manipulated by moving points 562 and/or 564, which may be moved relative to a cost axis 566 and a distance axis 568. The points 544 and/or 546 represent the maximum cost penalty within the boundary 538. For purposes of illustration, the point 562 may be moved to a position 570 and the point 564 may be moved to a position 572. A portion of the line 542 is currently at position 574 and may be moved, for example, to a position 576 or a position 578.

In some embodiments, the cost curve 530 may be provided as a graphical tool that enables a user to manipulate the lines 540 and 542 for spatial cost assessment when determining a convergence solution. For example, a computer system (e.g., the computer system 250 of FIG. 2B) may execute one or more of the methods described herein based on the actions of a geologist who is manipulating the lines 540 and 542 via a graphical user interface. Accordingly, the geologist or other user may "drive" the BHA along a desirable path as the diagram 530 may be viewed from the perspective of the drill bit/BHA looking forward into the formation from a cost perspective. The computer system may then create a convergence plan based on how the drill bit/BHA is driven. This allows the geologist to interact visually with the described methods to create a convergence plan.

In some embodiments, areas (not shown) of extreme or even infinite cost may be defined within the region 536 to prevent solutions from entering those areas. For example, a property line that marks a drilling limit may be given an extreme or infinite cost with the cost rising sharply as the property line is approached. In another example, an old well may be avoided by marking it as an area of extreme or infinite cost, thereby using cost as an anti-collision measure. Accordingly, the behavior of solutions can be affected by defining geographic zones as areas of extreme or infinite cost and/or by controlling the rate at which the costs increase as those zones are approached.

Referring again to FIG. 5A, in step 512, the segment's cost is calculated based on the cost assigned to the segment's location on the cost curve. Continuing the previous example of the target path 104 having a value of $1000 per foot, if the segment is at the $600 mark on the cost curve, the offset cost is $400 (i.e., $1000−$400=$600) if the cost curve is defined in terms of value. If the cost curve is defined in terms of cost, the mark would indicate the $400 cost (e.g., the mark identifies the cost rather than the value). In step 514, the segment's cost is added to the path's cost (e.g., current segment cost+current path cost=new path cost).

In step 516, a determination may be made as to whether the cost of another segment of the path is to be determined. If the cost of another segment is to be identified, the method 500 returns to step 506 and begins calculating the next segment's cost. If there are no other segments for which cost is to be identified, the method 500 continues to step 518. In step 518, the path cost is output.

With additional reference to FIG. 6, one embodiment of a method 600 illustrates a process that may be used as step 406 of FIG. 4 to identify the curvature cost of a convergence path. It is understood that this is only an example of step 406 and other methods may be used. The curvature cost addresses the costs associated with curves in the path. Such costs include reaming, casing requirements, the impact of friction on later well segments, and similar costs. The curvature cost may be viewed as a mixture of friction impact, steerage issues, and launch penalty.

The launch penalty can be in a relative zone or an absolute zone and addresses system stability. The absolute zone launch penalty addresses drilling above a certain angle (e.g., ninety-eight degrees). This is a common problem when drilling a horizontal well because moving above that angle makes it very difficult to get the well to come back down to the desired path because there is less weight pulling the BHA down (e.g., gravity is not aiding the course correction as much). Once this tipping point angle is reached, the BHA tends to move aggressively away from the plan (e.g., launches).

The relative zone launch penalty addresses the impact of geo-drift and drilling at an offset from a planned angle. When not staying on bed dip (e.g., when crossing the grain), off course movement may be accelerated. Due to this, drilling against the grain of the formation tends to create an unstable system.

The launch penalty creates an exponential cost curve as the tipping point angle is approached and passed or when cross grain drilling is needed (particularly for an extended period of time) because of the difficulty in correcting the associated problems. Accordingly, the present process applies a launch penalty for approaching angles or drilling patterns where this aggressive movement may begin. Because the launch penalty is an exponential cost curve that penalizes paths that approach undesirable situations, the cost increases exponentially the closer the path gets to the absolute or relative zones.

In step 602, rotation/sliding segments of the path may be identified. This may include identifying the lengths and locations of the rotation segments and the lengths, locations, and build rates of the sliding segments. Launch penalty costs may be applied based on build rate information. In step 604, the overall curvature of the path is identified.

In step 606, the peak curvature of the path is identified. The peak curvature is identified using a defined window (e.g., a window spanning a defined number of feet) to identify dogleg severity. As this window is moved along the path, the peak curvature is located and generally occurs when the entire window contains a slide or when the window overlaps multiple slides. It is understood that the distance defined for the window may greatly impact the identified peak curvature. For example, assume there is a five degree curve that occurs within ten feet and there is not another curve within one hundred feet. Using a sliding window spanning one hundred feet will result in a dogleg severity of 5°/100 ft. Using a sliding window spanning ten feet will result in a dogleg severity of 5°/10 ft, which appears to be a much more severe dogleg even though it is actually the same one. The peak curvature, which may be less than the threshold for dogleg severity as applied by the rules in step 308 of FIG. 3, may be identified to determine cost because the greater the peak curvature, the greater the impact on later portions of the path.

For this reason, the locations of curvature may also be identified. For example, a curve early in the well will affect the remainder of the well, while a curve near the end of the well will have far less impact on the path as a well. Accordingly, a curve early in the well may more drastically affect the cost of the remainder of the well and so may be assigned a higher cost than a curve near the end of the well. As described above, how the sample size is defined (e.g., the distance spanned by the window), may have a significant impact on how a curve is evaluated.

In step 608, a curvature cost for the path is identified based on the overall (e.g., average) curvature, peak curvature, and location(s) of curvature. In step 610, the curvature cost is output.

Referring to FIG. 7, one embodiment of a method 700 illustrates a process that may be used as step 408 of FIG. 4 to identify the time cost of a convergence path. It is understood that this is only an example of step 408 and other methods may be used.

In step 702, rotation/sliding segments of the path may be identified. This may include identifying the length of the rotation segments and the length and build rate of the sliding segments. In some embodiments, this may use information from step 602 of FIG. 6 or information from this step of the method 700 may be used with the method 600 of FIG. 6. In step 704, a time for each segment may be identified. For example, there is an ROP for sliding and an ROP for rotating, and one or both of these ROPs may change over time. In addition, there may be a setup time needed to prepare for a slide, which may include the time needed to orient the toolface and account for reactional torque in preparation for the slide. Accordingly, the total time may be calculated as ((ROP for slide*slide distance)+(ROP for rotation*rotation distance)+setup time for slide).

Empirical ROP information may be used to provide current time data. Generally, sliding segments will have higher time costs than rotation segments of the same length and the ROP and/or time may change depending on the bit's location in the well. There is a ratio of slide ROP versus rotation ROP and this ratio may change over the course of the well. For example, in the vertical portion of the well, the slide/rotation ROP may be a 4:1 ratio, while at the end of the lateral it may be a 20:1 ratio. This is empirically calculated in real time or near real time so that the cost penalty threshold may be continuously updated. Accordingly, the penalty for sliding at the end of the well may be different than the penalty for sliding at the beginning of the well and the method 700 may take this into account using the empirically calculated ROP.

In step 706, the total time for the path may be identified. This may include adding together the times calculated in step 704 or may include other calculations. In step 708, a time cost is calculated for the path based on the cost of the rig per unit time (e.g., total path time*rig cost per unit time=path cost). Rig time may include some or all costs associated with the rig, including labor costs, operating costs (e.g., fuel), material costs (e.g., pipe), and/or other costs. For example, assume that a slide segment has a setup time of ten minutes and a slide time of forty minutes, and the rig has a time cost of $75,000 per day. The segment cost would be fifty minutes times the rig cost per minute (e.g., 50 minutes* ($75,000/1440 minutes)=$2604.17). This could further be divided into cost per foot and/or otherwise converted for additional comparisons and/or calculations. In step 710, the time cost is output.

Referring to FIG. 8, one embodiment of a method 800 illustrates another process that may be used as step 408 of FIG. 4 to identify the time cost of a convergence path. It is understood that this is only an example of step 408 and other methods may be used. As shown in FIG. 8, cost may be calculated per segment in step 806 and the segment costs may be added to identify the total path cost in step 808. As the steps are similar or identical to those of FIG. 7 with the exception of steps 806 and 808, FIG. 8 is not described in additional detail herein.

It will be appreciated by those skilled in the art having the benefit of this disclosure that this system and method for selecting a drilling path based on cost provides an improved process for comparing drilling paths on a cost basis and selecting the drilling path that best satisfies one or more cost parameters. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for drilling a well using one of a plurality of convergence paths that may be drilled by a bottom hole assembly (BHA) comprising:
   identifying, by a computer system, a plurality of geometric convergence paths, wherein each of the geometric convergence paths provides a convergence solution from a defined bottom hole assembly (BHA) location to a target drilling path of a well plan;
   calculating, by the computer system, an offset distance for drilling by the BHA each of the geometric convergence paths connecting the BHA location to the target drilling path;
   determining, by the computer system, a drill path curvature associated with drilling each of the geometric convergence paths by the BHA;
   determining, by the computer system, a time required for drilling each of the geometric convergence paths by the BHA;
   determining, by the computer system, an optimal geometric convergence path of the plurality of geometric convergence paths responsive to the offset distance for drilling each of the geometric convergence paths, the drill path curvature associated with each of the geometric convergence paths and the time required for drilling each of the geometric convergence paths;
   providing the determined optimal geometric convergence path to a controller device of a drilling rig;
   automatically controlling, by the controller device, the drilling rig, to drill in accordance with the determined optimal geometric convergence path.

2. The method of claim 1, wherein the step of identifying further comprises:
   obtaining, by the computer system, drill plan information relating to a well plan; and
   identifying, by the computer system, the plurality of geometric convergence paths responsive to the drill plane information.

3. The method of claim 2, wherein the drill plan information comprises at least one of the well plan, seismic data, data defining the target path, BHA location, BHA trajectory, BHA ROP and drift information.

4. The method of claim 2, wherein the step of identifying further comprises limiting the plurality of convergence paths to a predetermined number of convergence paths.

5. The method of claim 2, wherein the step of identifying further comprises the steps of removing some of the plurality of convergence paths to remove illogical convergence paths.

6. The method of claim 2, wherein the step of identifying further comprises comparing the plurality of convergence paths to a predetermined rule set to remove a portion of the plurality of convergence paths from further consideration for violating rules of the predetermined rule set.

7. The method of claim 1, wherein the step of determining the optimal geometric convergence path is further responsive to geometric drift associated with the plurality of convergence paths.

8. The method of claim 1, wherein the step of determining the optimal geometric convergence path further comprises normalizing each of the plurality of convergence paths against a longest convergence path.

9. The method of claim 1, wherein the step of calculating the offset distance for each of the plurality of geometric convergence paths further comprises calculating the offset distance for a plurality of segments making up a geometric convergence path of the plurality of geometric convergence paths.

10. The method of claim 1, wherein the step of determining a drill path curvature further comprises the step of determining, by the computer system a peak drill path curvature associate with drilling each of the plurality of geometric convergence paths.

11. The method of claim 1, wherein the step of determining the time required for drilling each of the plurality of geometric convergence paths further comprise determining a time required to for drilling a plurality of segments making up a convergence path of the plurality of geometric convergence paths.

12. The method of claim 1, wherein the step of determining the time required for drilling each of the plurality of geometric convergence paths is further responsive to a rate of penetration (ROP) for slide, a slide distance, an ROP for rotation, a rotation distance and a setup time for the slide.

13. A method for drilling a well using one of a plurality of convergence paths that may be drilled by a bottom hole assembly (BHA) comprising:
   identifying, by a computer system, a plurality of geometric convergence paths, wherein each of the geometric convergence paths provides a convergence solution from a defined bottom hole assembly (BHA) location to a target drilling path of a well plan;
   calculating, by the computer system, an offset distance for drilling by the BHA each of the geometric convergence paths connecting the BHA location to the target drilling path;
   determining, by the computer system, a drill path curvature associated with drilling each of the geometric convergence paths by the BHA;
   determining, by the computer system, a time required for drilling each of the geometric convergence paths by the BHA;
   determining, by the computer system, an optimal geometric convergence path of the plurality of geometric convergence paths responsive to at least one of the offset distance for drilling each of the geometric convergence paths, the drill path curvature associated with each of the geometric convergence paths and the time required for drilling each of the geometric convergence paths;
   providing the determined optimal geometric convergence path to a controller associated with a drilling rig;
   providing a display of the determined optimal geometric convergence path on a display associated with the drilling rig; and
   automatically controlling, by a controlling device, the drilling of a wellbore in accordance with the determined optimal geometric convergence path.

14. The method of claim 13, wherein the step of identifying further comprises:
obtaining, by the computer system, drill plan information relating to a well plan; and
identifying, by the computer system, the plurality of geometric convergence paths responsive to the drill plane information.

15. The method of claim 14, wherein the drill plan information comprises at least one of the well plan, seismic data, data defining the target path, BHA location, BHA trajectory, BHA ROP and drift information.

16. The method of claim 14, wherein the step of identifying further comprises limiting the plurality of convergence paths to a predetermined number of convergence paths.

17. The method of claim 14, wherein the step of identifying further comprises the steps of removing some of the plurality of convergence paths to remove illogical convergence paths.

18. The method of claim 14, wherein the step of identifying further comprises comparing the plurality of convergence paths to a predetermined rule set to remove a portion of the plurality of convergence paths from further consideration for violating rules of the predetermined rule set.

19. The method of claim 13, wherein the step of determining the optimal geometric convergence path is further responsive to geometric drift associated with the plurality of convergence paths.

20. The method of claim 13, wherein the step of determining the optimal geometric convergence path further comprises normalizing each of the plurality of convergence paths against a longest convergence path.

21. The method of claim 13, wherein the step of calculating the offset distance for each of the plurality of geometric convergence paths further comprises calculating the offset distance for a plurality of segments making up a geometric convergence path of the plurality of geometric convergence paths.

22. The method of claim 13, wherein the step of determining a drill path curvature further comprises the step of determining, by the computer system a peak drill path curvature associate with drilling each of the plurality of geometric convergence paths.

23. The method of claim 13, wherein the step of determining the time required for drilling each of the plurality of geometric convergence paths further comprise determining a time required to for drilling a plurality of segments making up a convergence path of the plurality of geometric convergence paths.

24. The method of claim 13, wherein the step of determining the time required for drilling each of the plurality of geometric convergence paths is further responsive to a rate of penetration (ROP) for slide, a slide distance, an ROP for rotation, a rotation distance and a setup time for the slide.

25. The system of claim 23 further comprising a network interface and a drilling rig controller, wherein the network interface is configured to couple the at least one processor to the drilling rig controller, and the drilling rig controller is coupled to the drilling rig and is configured to control at least a portion of the drilling rig.

26. The system of claim 24 further comprising instructions for creating a set of drilling parameters for the drilling rig controller based on the selected geometric convergence path.

27. A drilling rig system comprising:
a drilling rig having a drill string and a bottom hole assembly at one end of the drill string;
at least one processor coupled to said drilling rig; and
at least one memory coupled to the at least one processor and configured to store a plurality of instructions executable by the at least one processor, the instructions including instructions for: (i) identifying a plurality of geometric convergence paths, wherein each of the geometric convergence paths provides a convergence solution from a defined bottom hole assembly (BHA) location to a target path for a bore hole; (ii) calculating an offset distance for drilling by the BHA each of the geometric convergence paths to the target path; (iii) identifying a drill path curvature of each geometric convergence path; (iv) identifying an amount of time needed to drill each geometric convergence path; (v) selecting one of the geometric convergence paths as an optimal geometric convergence path based on at least one of the offset distance, the drill path curvature, and the amount of time needed to drill the geometric convergence paths; (vi) outputting the selected geometric convergence path; and (vii) automatically controlling a drilling rig to advance the bottom hole assembly and the drill string in accordance with the selected geometric convergence path.

* * * * *

(12) INTER PARTES REVIEW CERTIFICATE (3375th)

United States Patent
Burkhart et al.

(10) Number: US 9,865,022 K1
(45) Certificate Issued: Jan. 5, 2024

(54) SYSTEM AND METHOD FOR DEFINING A DRILLING PATH BASED ON COST

(71) Applicants: John Burkhart; Todd Benson; Teddy Chen

(72) Inventors: John Burkhart; Todd Benson; Teddy Chen

(73) Assignee: MOTIVE DRILLING TECHNOLOGIES, INC.

Trial Number:

IPR2022-00288 filed Jan. 6, 2022

Inter Partes Review Certificate for:

Patent No.: 9,865,022
Issued: Jan. 9, 2018
Appl. No.: 15/180,661
Filed: Jun. 13, 2016

The results of IPR2022-00288 are reflected in this inter partes review certificate under 35 U.S.C. 318(b).

INTER PARTES REVIEW CERTIFICATE
U.S. Patent 9,865,022 K1
Trial No. IPR2022-00288
Certificate Issued Jan. 5, 2024

AS A RESULT OF THE INTER PARTES REVIEW PROCEEDING, IT HAS BEEN DETERMINED THAT:

Claims 1-6, 9, 10, 13-18, 21 and 22 are cancelled.

\* \* \* \* \*